March 29, 1927.  1,622,497
A. C. DIBBLE
LEAF LIFTING DEVICE FOR RIDING CULTIVATORS
Filed Jan. 17, 1922  2 Sheets-Sheet 1
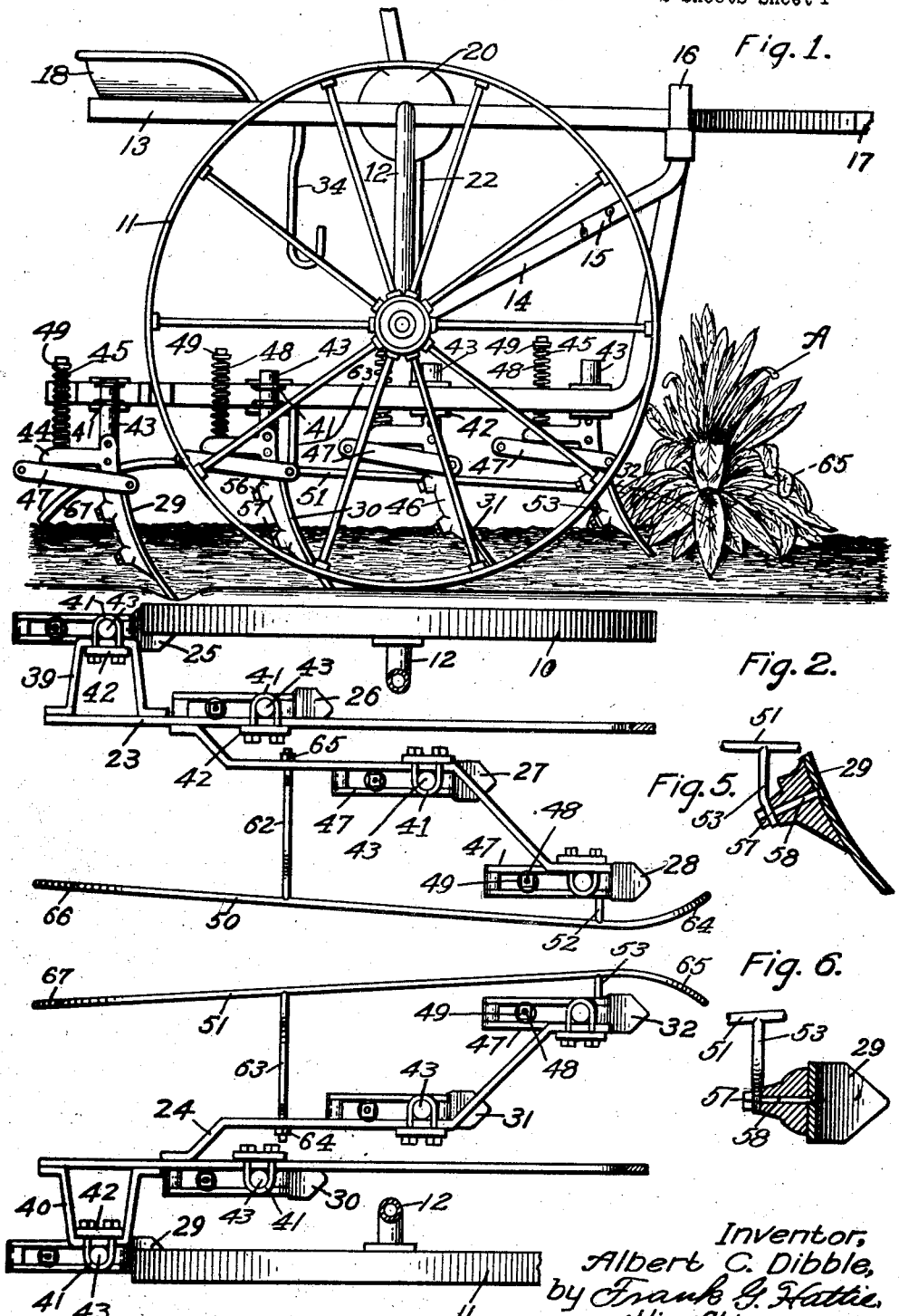
Inventor,
Albert C. Dibble,
by Frank G. Hattie,
His Attorney.

March 29, 1927.
A. C. DIBBLE
1,622,497
LEAF LIFTING DEVICE FOR RIDING CULTIVATORS
Filed Jan. 17, 1922  2 Sheets-Sheet 2
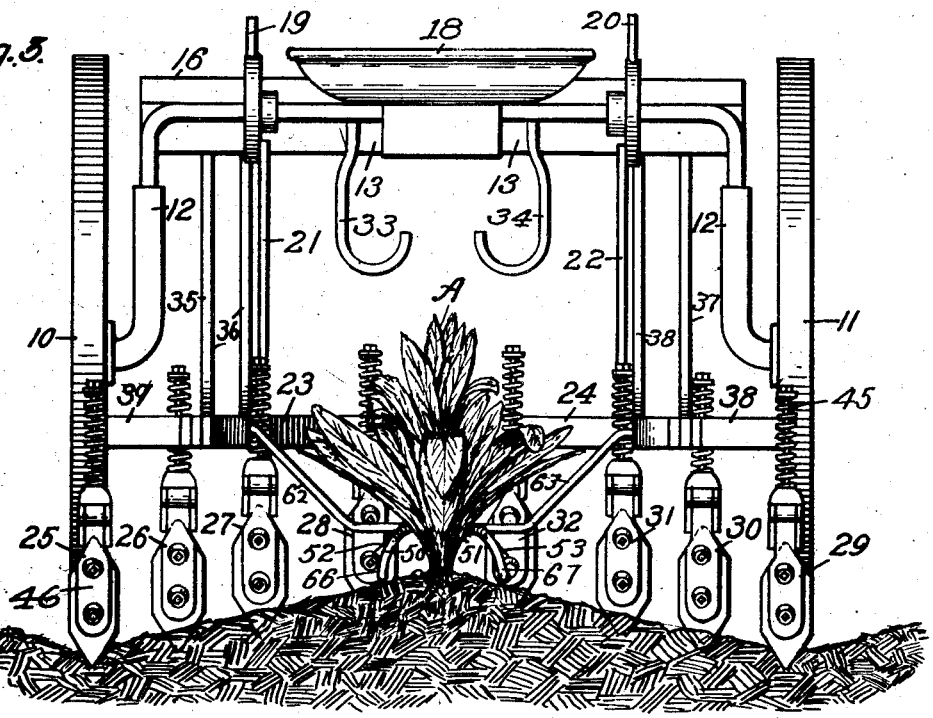
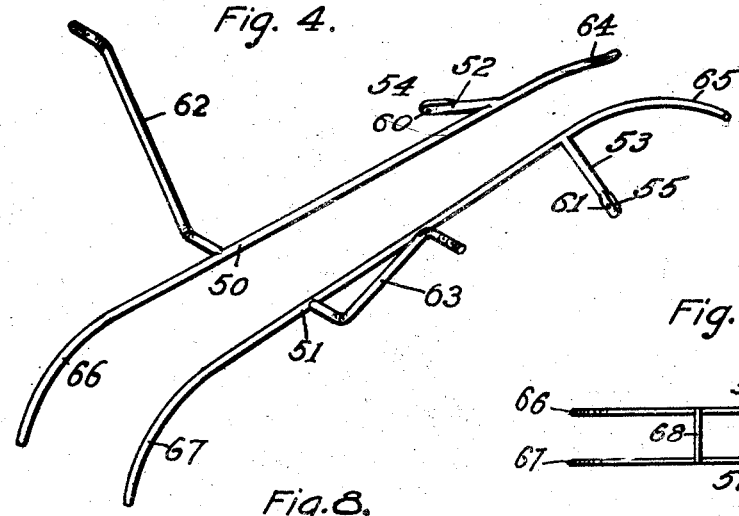
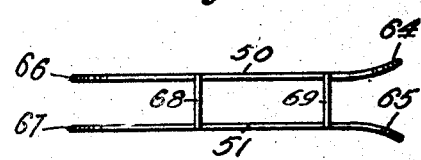
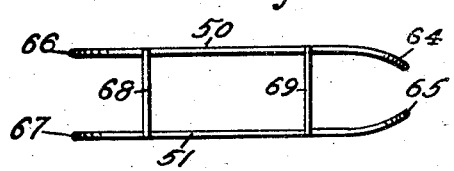
Inventor,
Albert C. Dibble,
by Frank G. Hattie
His Attorney.

Patented Mar. 29, 1927.

1,622,497

UNITED STATES PATENT OFFICE.

ALBERT C. DIBBLE, OF SOUTHWICK, MASSACHUSETTS.

LEAF-LIFTING DEVICE FOR RIDING CULTIVATORS.

Application filed January 17, 1922. Serial No. 529,904.

The invention relates to improvements in leaf lifting devices for riding cultivators or the like, adapted for plowing tobacco, corn, or other crops which are placed in rows with ditches between them. As the cultivator operates normally on both sides of the row, the dirt is raised on an incline towards the plants, which allows the overhanging leaves sufficient room to droop without lying in the dirt or mud.

There is an uncertain amount of soil thrown upon the leaves or crops, which carries with it the waste material from the plants which are placed or dropped on or under the leaves, and which tends to drag them down and destroy them. My present invention aims to prevent the dirt and waste material from being thrown upon the plants, by lifting the leaves of the plants successively above the path of the dirt and waste material as it is thrown upon the row by the shovels as they pass along the row.

The invention consists of a leaf lifting device attached to a plurality of shovels located on a suitable gang frame or frames in V formation in horizontal plane, and an approximately V formation in the vertical plane, for throwing the dirt and soil around the roots of the plants, and also for digging a ditch between the rows. The ditch allows sufficient clearance to permit the leaf lifting device to be situated in such relation to the gang shovels that it will pass under the leaves or crops, and will lift or raise them out of the path of the dirt or soil thrown up by the said shovels, thereby protecting the said plants or crops from injury or destruction as the shovels pass along the row.

The object of my invention is to obviate the necessity of repairing the plants or removing the dirt from the leaves thrown up by the shovels after the cultivating operation, which tends to injure or destroy the plants. A further object of my invention is to provide a leaf lifting device for riding cultivators, which will not only protect the leaves on crops from being destroyed or injured, but will save an enormous amount of unnecessary labor, will insure a great saving in products, is simple in construction, and cheap to manufacture.

Referring to the figures. Fig. 1 is a side elevation of the riding cultivator with the leaf lifting device in position.

Fig. 2 is a plan view of the gang frame and shovels with the leaf lifting device in position.

Fig. 3 is a rear view of the cultivator with the leaf lifting device in position.

Fig. 4 is a perspective view of the leaf lifting rods.

Fig. 5 is a fragmentary view showing the forward shovel in vertical section with one of the lifting rods secured to it.

Fig. 6 is a horizontal section of the same.

Figs. 7 and 8 are modifications.

Referring to the drawings; the wheels 10 and 11 support the cultivator apparatus and are mounted on an upwardly extending U shaped frame 12. The frame 12 supports the main frame of the cultivator consisting of the horizontal bars 13, inclined bars 14 and 15, and cross frame 16, through which the bars 13 extend. The bars 13 are adapted to receive the tongue 17. The rear end of the bars 13 form a support for the seat 18. Mounted on the U shaped frame 12, are controlling devices 19 and 20, which are manually operated by suitable levers. Extending downwardly from the controlling devices 19 and 20 are the rods 21 and 22, the lower extremities of which are connected to the gang frames 23 and 24. Adjustably supported on the gang frame 23 on one side are the shovels 25, 26, 27 and 28; on the opposite side the gang frame 24 adjustably supports the shovels 29, 30, 31 and 32. The gang frames 23 and 24 with their respective shovels can be lifted vertically or shifted horizontally for the purpose of keeping the shovel in the right path while cultivating, to prevent them from injuring or destroying the crops or plants, or if an obstruction such as a rock or stump was in the path of the shovels they could be lifted above them to prevent the frames and shovels from being injured or destroyed.

The gang frames and their respective shovels are controlled horizontally by the foot stirrups 33 and 34. The gang frames 23 and 24 extend upwardly as indicated by 35 and 36 on one side and 37 and 38 on the opposite side, and are so arranged in relation to cross frame 16 and the operating devices, that the gang frames are always under manual control. The shovels can be placed on the gang frame in any suitable position to obtain the best results. The shovels are secured to the gang frames 23 and 24 by the yoke 41, the ends of which extend through the plate 42 and enclose the shank 43. The shank 43 of the shovel is adapted to receive the yoke 41 on one side, and the other side rests against the gang frames 23 and 24. The plate 42 being located on one side of the gang frame and the shovel shank 43 on the opposite side, will permit the yoke 41 to clamp the shovel rigidly in position by suitable nuts. The shovels are flexibly connected to the gang frame, and rigidly secured to the shovel shank 43 is a projection 44 which forms a lower abutment for the spring 45, and is a part of the cushioning device for absorbing the vibration of the shovels. Pivotally secured to the shovel shank 43 is a shovel frame 46, integral with which is a bell crank extension 47 adapted to hold the lower end of the rod 48. The upper end of the rod 48 is provided with a washer abutment 49, against which the upper extremity of the spring 45 rests, and the compression of the said spring acting against the movable abutment 49 and rigid abutment 44 holds the shovel in position in such a manner as to absorb the vibration of the shovels as they pass through the soil.

With this end in view, the embodiment of my invention relates to a leaf lifting device for riding cultivators where two gangs of shovels are used, and the invention consists of two rods 50 and 51 of special formation for gradually lifting the leaves or crops being cultivated out of the path of the dirt or soil being thrown up by the shovel as the cultivator passes along the row. The rods 51 and 52 are formed so as to lift the leaves that are close to the ground as the cultivator approaches the plant A, Fig. 1, which shows the leaves hanging over into the ditch. As the cultivator passes along, the plants will ride up the rods into the position of the plant A, shown in Fig. 3, and as the cultivator passes, the leaves will drop back to their normal position. The lifting rods 50 and 51 are provided with forward supporting lugs 52 and 53 having the outer ends flattened, as indicated by 54 and 55, which set against the frames of the forward shovels 28 and 32 and are held in position by their respective nuts 56 and 57. These nuts and bolts normally hold the shovel in position on the frame. In other words, the shovels 28 and 32 are normally held by the nuts 56 and 57 respectively, and to mount the rods in position the nut 57 is removed and the bolt is of sufficient extra length to receive the lugs 52 and 53, after which the nut is threaded on the bolt, thereby making the lugs integral with the shovel frame. The rear ends of the rods 50 and 51 are supported by the upwardly extending supporting arms 62 and 63 which are pivotally secured to the gang frames 23 and 24 and held in position by the nuts 64 and 65. These rods are of such formation, as shown in Fig. 3, to allow the leaves to pass through after they are lifted without injuring or breaking them. The rods 50 and 51 are so arranged on their respective gang frames and shovels that any change in their movement will be communicated to their respective rod, which will always be effective in lifting or protecting the leaves from the dirt thrown up by the shovel. The rods 50 and 51 will also conform to the longitudinal vibration of the shovel; that is, if the forward shovel was forced backwardly by the dirt, the rods 50 and 51 would move back and the rear supports 62 and 63 would swing in the gang frame 23 and 24, thereby releasing the vibration. The forward ends of the leaf lifting rods 50 and 51 extend outwardly and downwardly as indicated by 64 and 65 to a level near the ground or hill, as shown in Figs. 1 and 2. It can be readily seen that the lower leaves of the plant will be lifted up on the rods out of the way of the dirt thrown up by the shovels to the position shown in Fig. 3, or within the lifting function of the rods. After the leaves are lifted up, they slide along the rods, which gradually open to the rear ends of the rods which are curved downwardly as indicated by 66 and 67, which allows the leaves to gradually settle down from their lifted position after the cultivator passes, without being injured or covered with dirt. The leaf lifting rods are so constructed and arranged that they will conform readily to all the movements and vibration of the gang frames and shovels, and also can be readily put on or taken off. Although the device is especially adapted for cultivators having two gang frames and sets of shovels which operate on both sides of the row at a time, I do not confine my construction solely to this end, but in a broader sense the leaf lifters can operate separately or together, as shown in Figs. 7 and 8. In Fig. 7, the rods 50 and 51 are held together by the cross bars 68 and 69 which are crowning to allow the plants to pass through and are used for lifting both sides of the plant at once under any condition, otherwise, the same as the construction shown in Figs. 1, 2, 3 and 4.

Fig. 7 shows the rods 50 and 51 tied together by the rods 68 and 69 and can be of any shape, due to the use of the rods which in this case are used between the row acting against one side of two rows of plants and the ends 64 and 65 are turned in the opposite direction to suit the working conditions. The particular novelty of this invention is in a riding cultivator having a plurality of shovels so arranged in a V formation, both horizontally and vertically, to dig a ditch between the rows or plants to allow a leaf lifting device to pass under the leaves and lift them out of the path of the dirt thrown up by the shovels.

While I have shown and described a preferred embodiment of my invention, it will be understood that various changes in the shape, form and minor mechanical details may be resorted to without departing from the spirit of the invention or sacrificing any of the natural advantages thereof.

What I claim as new and desire to secure by Letters Patent of the United States is:—

1. In a cultivator comprising gang frames, a plurality of shovels yieldingly secured to the said gang frames, a plant lifter comprising rods connected to the front shovels and the frames for lifting the leaves of the plants out of the path of the dirt thrown up by the said shovels, and means for allowing the leaf-lifting rods to move in conformity with the front shovels for the purpose specified.

2. In a cultivator comprising gang frames, a plurality of shovels yieldingly secured to the gang frames, a plant lifter comprising rods connected to the front shovels and the gang frames, downwardly and outwardly extending ends on the rods to receive the leaves or plants, and downwardly extending ends on the opposite extremity of the rods to allow the leaves to drop easily to their normal position.

3. In a cultivator comprising gang frames, a plurality of shovels yieldingly secured to the gang frame, a plant lifter comprising rods connected to the front shovels and the frames for lifting and lowering the leaves of the plants out of the path of the dirt thrown up by the shovels.

ALBERT C. DIBBLE.